Figure 1:
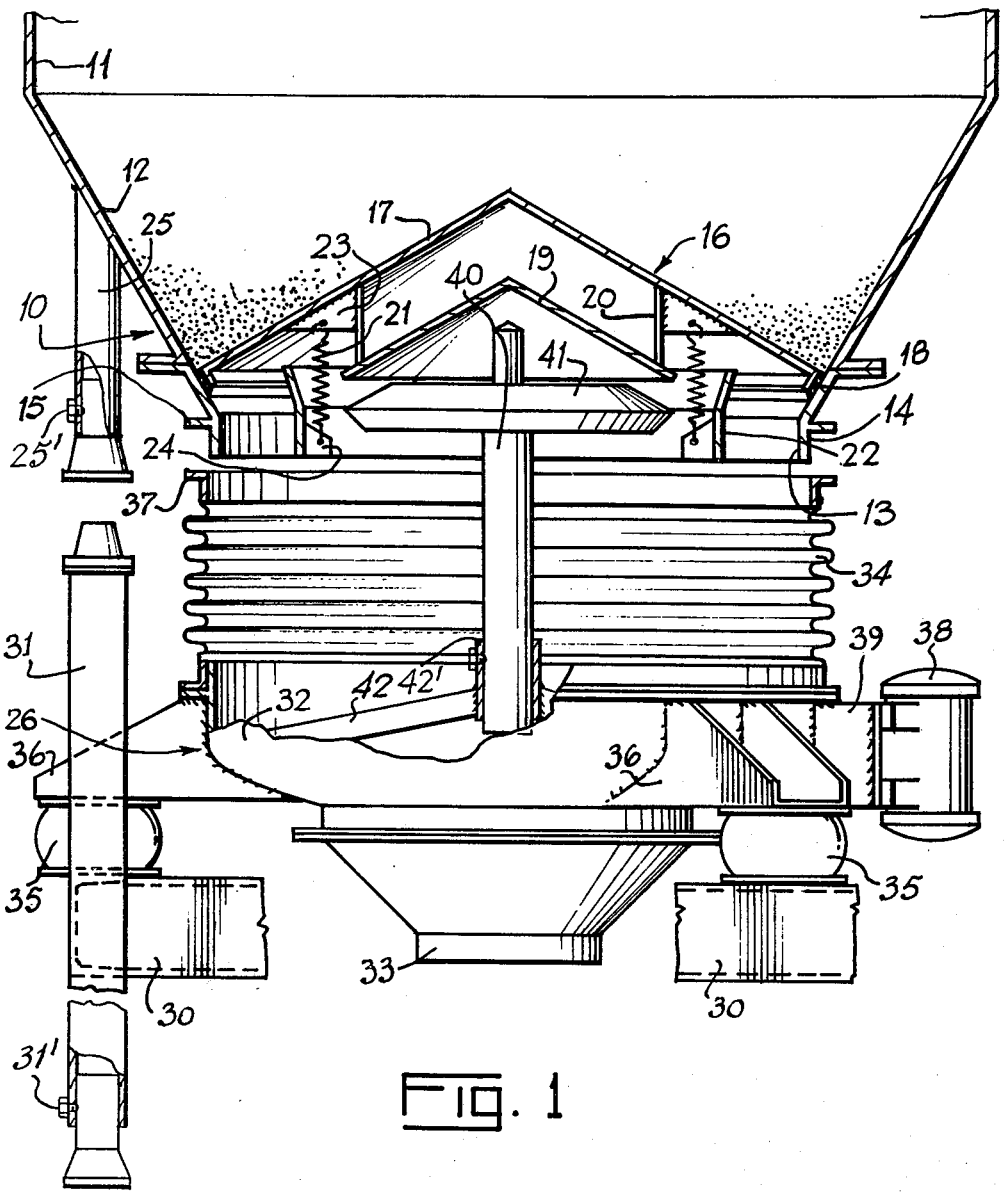

United States Patent [19]

Williams

[11] 3,971,493

[45] July 27, 1976

[54] COMBINATION TRANSPORTABLE CONTAINER AND DISPENSING RECEIVER

[76] Inventor: David Michael Williams, 11 Ricardo Road, Minchinhampton, Stroud, Gloucestershire, England

[22] Filed: Aug. 26, 1974

[21] Appl. No.: 500,505

[52] U.S. Cl. .............................. 222/185; 222/199; 222/325; 222/518; 141/351; 141/363
[51] Int. Cl.² ...................... B65G 3/12; B67D 5/06
[58] Field of Search .......... 222/199, 198, 448, 226, 222/230, 231, 243, 246, 509, 402.25, 501, 518, 514, 185, 162, 325; 141/72, 351–356, 363

[56] References Cited
UNITED STATES PATENTS

| | | | |
|---|---|---|---|
| 2,788,809 | 4/1957 | Paton | 141/353 |
| 3,123,107 | 3/1964 | Kappler | 141/352 |
| 3,173,583 | 3/1965 | Wahl | 222/199 |
| 3,543,814 | 12/1970 | Aluotto | 141/335 |
| 3,563,420 | 2/1971 | Ansley | 222/199 |
| 3,632,174 | 1/1972 | Miller | 222/509 X |
| 3,791,539 | 2/1974 | Reckseit et al. | 214/17 C |

FOREIGN PATENTS OR APPLICATIONS 1,224,888   3/1971   United Kingdom ................. 222/199

*Primary Examiner*—Robert B. Reeves
*Assistant Examiner*—Charles A. Marmor
*Attorney, Agent, or Firm*—Norris & Bateman

[57] ABSTRACT

A transportable container for handling powdered, granulated or other particulated solid materials, having a tapering lower wall portion of hopper form and a discharge opening at its base, the opening being normally closed by a valve member which is movable upwardly into the interior of the container to define an annular opening between its periphery and the internal surface of the container wall, retaining springs being provided within the container and arranged to hold the valve member in its closed position until lifted by, for example, a probe fixed relative to a material receiving member onto which the transportable container may be lowered.

11 Claims, 2 Drawing Figures

COMBINATION TRANSPORTABLE CONTAINER AND DISPENSING RECEIVER

This invention

THIS INVENTION concerns the handling of powdered, granulated or other particulate solid materials. Such materials will hereinafter be termed materials of the kind referred to.

Materials of the kind referred to are widely used by the process industries and are normally dispensed for use from bins or hoppers. The materials may be delivered to the position where they are to be used in many different ways, but will normally be stored in bulk before being passed to such bins or hoppers.

The use of transportable containers which are adapted to be returned to a source of supply for re-filling when emptied has been proposed with a view to reducing the extent to which the materials need to be handled.

An object of the present invention is to provide a transportable container suitably arranged and adapted to deliver materials of the kind referred to to the position where they are to be used, and from which said materials may be dispensed.

According to the present invention there is provided a transportable container for materials of the kind referred to having a tapering wall portion of hopper form, and a discharge opening at its base, said opening being normally closed by a valve member which is movable upwardly into the interior of the container to define an annular opening between its periphery and the internal surface of the container wall, resilient retaining means being provided within said container and arranged normally to hold said valve member in its closed position.

Figure 2:
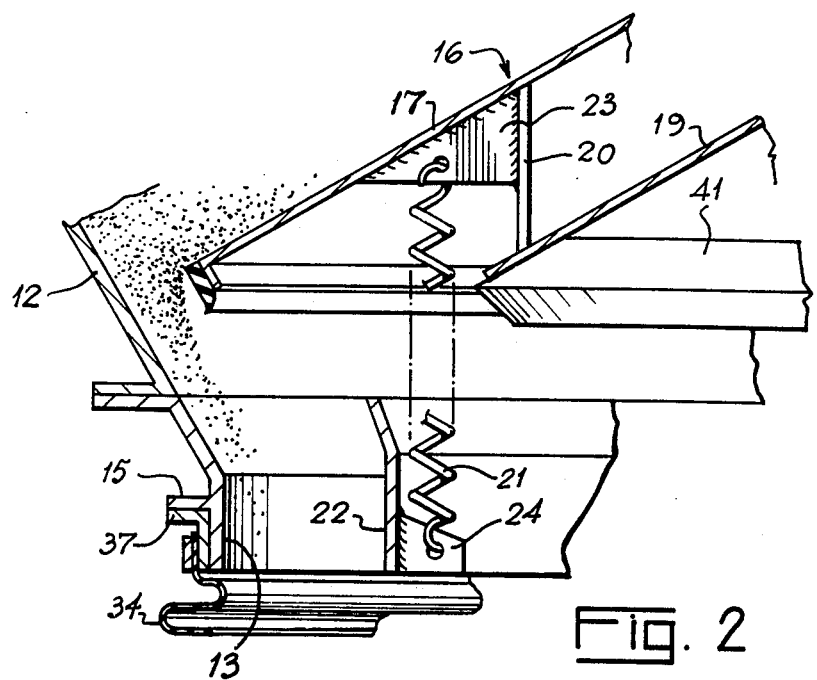

An embodiment of the invention will now be described by way of example only, with reference to the accompanying drawings, in which:

FIG. 1 is a partial vertical section through a transportable container and receiving equipment therefor, the container being shown approaching a position of engagement on the equipment; and FIG. 2 is a detailed section of part of the arrangement illustrated in FIG. 1 with the container operatively located on said equipment.

Referring firstly to FIG. 1 it will be seen that the transportable container which is generally indicated at 10 includes an upper portion of circular cross section defined by a cylindrical shell 11, and a lower portion of hopper form defined by an inverted truncated conical wall 12, having a central circular opening 13 at its base. The opening 13 is defined by a short vertical cylindrical wall 14 which is surrounded on its outer surface by a horizontal flange 15.

The opening 13 is normally closed by a valve member generally indicated at 16 and comprising a first upright conical shell 17 having a sealing strip 18 around its periphery, and a smaller upright conical shell 19 attached to the first shell 17 beneath the latter and concentrically therewith by a spacer or spacers 20. The sealing strip 18 engages with the internal surface of the wall 12 when the valve member is in its lowered position as shown in FIG. 1.

A plurality of coiled tension springs 21 are provided in spaced relationship around and within an annular collar 22 attached to the container in the lower region thereof and spaced inwardly from the cylindrical wall 14. The springs are attached by members 23 and 24 respectively to the first conical shell 17 and the annular collar 22 and thus serve normally to retain the valve member 16 in a lowered position wherein the sealing strip 18 rests in sealing engagement on the internal tapering surface of the wall 12.

Attached to the lower portion of the container 10 are a plurality of legs 25 whose lower ends are positioned slightly below the opening 13 whereby the container may be stood upon the ground.

The receiving equipment generally indicated by the reference numeral 26 is mounted on a frame 30 having legs 31 to hold same at an elevated position. The equipment 26 is generally of a known form and includes a material receiving member 32 of dish-like form having a central opening 33 at its lower extremity for the discharge of material therefrom. The receiving member 32 is secured to the frame 30 through the intermediary of resilient isolator pads 35 and supporting brackets 36.

Upwardly spaced from the dish-like receiving member 32 by a resilient sleeve 34 is a circular flange 37.

A vibration motor 38 of a suitable known kind is secured to the equipment by a bracket 39 to enable the dish-like receiving member 32 to be vibrated relative to the frame 30.

A probe generally indicated at 40 and carrying adjacent its upper end a disc 41 having a chamfered upper peripheral edge is secured by radial brackets 42 to the receiving member 32 and extends upwardly to a position above the upper extremity of the resilient sleeve 34.

In use the transportable container 10 can be filled at one location with material to be dispensed and can be transported by any suitable means to the location where the material is to be used and where the receiving equipment is permanently located. The container is adapted to be lowered into engagement with the equipment such that the lower ends of the legs 25 engage with the upper ends of the legs 31.

As the container is lowered, the upper end of probe 40 engages the underside of the lower shell 19 of the valve member 16 at approximately the same time as the flanges 15 and 37 become engaged. Further lowering of the container causes the valve member 16 supported by the probe 40 and previously held in sealing engagement with the container wall 12 by means of the springs 21, to be raised relative to the opening 13 in the container. This condition can be seen in FIG. 2 wherein material can flow from the container through an annular opening surrounding the sealing strip 18, and into the receiving member 32 of the equipment, the sleeve 34 forming a seal to prevent escape of the material in transit from the container to the receiving equipment. During transfer of the material from the container the valve member 16 is held firmly down against the probe 40 by the springs 21. It will be understood that actuation of the motor 38, besides vibrating the receiving member 32, also causes vibration of the probe 40 and thus the valve member 16 thereon. Such vibration promotes the easy flow of material from the container through the receiving member 32 and out of its lower opening 34. The extent to which the valve member 16 is raised and hence the dimension of the annular opening around its periphery can be adjusted having regard to the nature of the material to be dispensed, and this is achieved by having one or both of the mating ends of legs 25 and legs 31 adjustable in height thus to enable adjustment of the actual vertical position of the container relative to the receiving equipment.

It will be appreciated that it is not intended to limit the invention to the above example only, many variations such as might readily occur to one skilled in the art being possible without departing from the scope of the invention as defined in and by the appended claims.

Thus, for example, the form of the activator device may be different from that described and the material receiving member and the valve member may be vibrated at different frequencies and/or in different directions as desired.

Again, for example, the probe on the equipment for engaging the underside of the valve member of the container may be vertically adjustable as an alternative means of adjusting the extent to which the valve member is raised relative to the base of the container when the combination is in use.

FIG. 1 shows the various adjustments above described. The vertical length of each container leg 25 may be adjusted at the telescopic connection indicated at 25'. The adjustable feet of receiving equipment legs 31 are shown as incorporating the telescopic connection 31'. The probe 40 is telescopically adjustable in collar 42' fixed to brackets 42.

What is claimed is:

1. In combination, a transportable container for particulate materials, comprising a tapering wall portion of hopper form, means defining a discharge opening at its base, a movable valve member adjacent said discharge opening, resilient means urging said valve member downwardly such that the periphery of said valve member is normally held in sealing contact with the inner surface of said tapering wall portion to close said discharge opening, said resilient means comprising a plurality of tension spring means arranged in spaced relationship with each spring means having one end connected to said valve member and the other end anchored on said container, said resilient means and said valve member being wholly disposed within said container above said discharge opening, and said valve member being movable upwardly against the action of said resilient means to define an annular opening between its periphery and the internal surface of said container wall for discharging material from the container; and receiving equipment permanently located at a position where the materials are to be dispensed from the container and which is formed to removably mount said container, said receiving equipment including means operative as the container is lowered onto said equipment to engage the underside of said valve member to effect said upwards opening movement thereof, and said receiving equipment comprising a material receiving member of generally dish-like form and frame means for supporting said receiving member in an elevated position with respect to the ground and said transportable container in position above the receiving member, resilient isolator means disposed between said material receiving member and the frame, and means for vibrating said material receiving member with respect to said frame.

2. A transportable container according to claim 1, wherein said valve member is in the form of an upright conical shell.

3. A transportable container according to claim 1, wherein said container wall portion is a lower portion of inverted truncated conical form defining the central circular discharge opening at its base, and an upper portion of the container wall is defined by a cylindrical shell extending upwardly from the upper peripheral edge of said lower portion.

4. A transportable container according to claim 1, having legs whereby it may be stood upon the ground in a vertical position with the discharge aperture spaced above the ground surface, said legs having means for operatively engaging said equipment whereby said container may be correctly positioned on said receiving equipment.

5. A transportable container according to claim 4, wherein said legs are provided with vertically adjustable feet.

6. A transportable container according to claim 1, wherein said vibrating means is connected also to cause vibration of said means for effecting upward movement of said valve member.

7. A transportable container according to claim 1 wherein means are provided on said frame means which are adjustable in height and formed to mount said container on said equipment whereby the vertical position of the container on the receiving equipment can be varied relative to the frame, and thus adjust the height through which the valve member may be raised.

8. A transportable container according to claim 1, wherein said container and equipment have respective lower and upper peripheral edges and a resilient sleeve is attached to the upper peripheral edge of said receiving equipment and extends upwardly therefrom to engage with the lower peripheral edge of said container.

9. A transportable container according to claim 1, wherein said means on the equipment for effecting upwards movement of said valve member comprises a probe in the form of a vertical spindle fixed relative to and extending above said receiving equipment.

10. In combination, a transportable container for particulate materials, comprising a tapering wall portion of hopper form, means defining a discharge opening at its base, a movable valve member adjacent said discharge opening, resilient means urging said valve member downwardly such that the periphery of said valve member is normally held in sealing contact with the inner surface of said tapering wall portion to close said discharge opening, said resilient means comprising a plurality of tension spring means arranged in spaced relationship with each tension spring means having one end connected to said valve member and the other end anchored on said container, said resilient means and said valve member being wholly disposed within said container above said discharge opening, and said valve member being movable upwardly against the action of said resilient means to define an annular opening between its periphery and the internal surface of said container wall for discharging material from the container; and receiving equipment permanently located at a position where the materials are to be dispensed from the container and which is formed to removably mount said container, said equipment including means operative as the container is lowered onto the equipment to engage the underside of said valve member to effect said upwards opening movement thereof, and said means for effecting upward movement of said valve member being vertically adjustable whereby the height through which the valve member is raised when the container is positioned on the receiving equipment may be adjusted.

11. A transportable container for particulate materials, comprising a tapering wall portion of hopper form, means defining a discharge opening at its base, a movable valve member adjacent said discharge opening, and resilient means urging said valve member downwardly such that the periphery of said valve member is normally held in sealing contact with the inner surface of said tapering wall portion to close said discharge opening, said resilient means comprising a plurality of tension spring means arranged in spaced relationship with each spring means having one end connected to said valve member and the other end anchored on said container, said resilient means and said valve member being wholly disposed within said container above said discharge opening, and said valve member being movable upwardly against the action of said resilient means to define an annular opening between its periphery and the internal surface of said container wall for discharging material from the container, said container being provided with an internal annular collar spaced inwardly of said discharge opening, and said spring means being distributed around and within said collar and having their other ends anchored upon said collar.

* * * * *